Jan. 19, 1954 J. A. JOHNSON 2,666,491
FARM TRACTOR

Filed Feb. 3, 1950 2 Sheets-Sheet 1

John A. Johnson
INVENTOR.

Jan. 19, 1954

J. A. JOHNSON 2,666,491

FARM TRACTOR

Filed Feb. 3, 1950

John A. Johnson
INVENTOR.

BY *Clarence A. O'Brien*
*and Harvey B. Jacobson*
Attorneys

Patented Jan. 19, 1954

2,666,491

UNITED STATES PATENT OFFICE 2,666,491

FARM TRACTOR

John A. Johnson, Zebulon, N. C.

Application February 3, 1950, Serial No. 142,218

2 Claims. (Cl. 180—45)

This invention relates to novel and useful improvements in tractors.

An object of this invention is to provide an improved tractor of novel assembly and which includes a frame having a centrally mounted engine and transmission, a steering post rising from the center of the frame, or substantially the center of the frame, together with a bracket holding a seat disposed in concentric relationship with respect to the post and capable of swinging movement so that the operator of the tractor may face in any direction which he wishes.

Another object of this invention is to steer the front and rear wheels of the tractor by the same steering wheel, this steering operation taking place selectively, that is, by operation or manipulation of a single lever, the operator of the tractor is able to select whether he desires to steer the tractor either by two or four of the wheels.

Another object of the invention is to improve the visibility of the operator of the tractor by placing the seat and steering wheel in such a position that there is no tractor part in front, to either side, or to the rear of his direct line of vision and for a considerable amount below and above his direct line of vision.

Ancillary objects and features will become apparent in following the description of the illustrated form of the invention.

Figure 1:
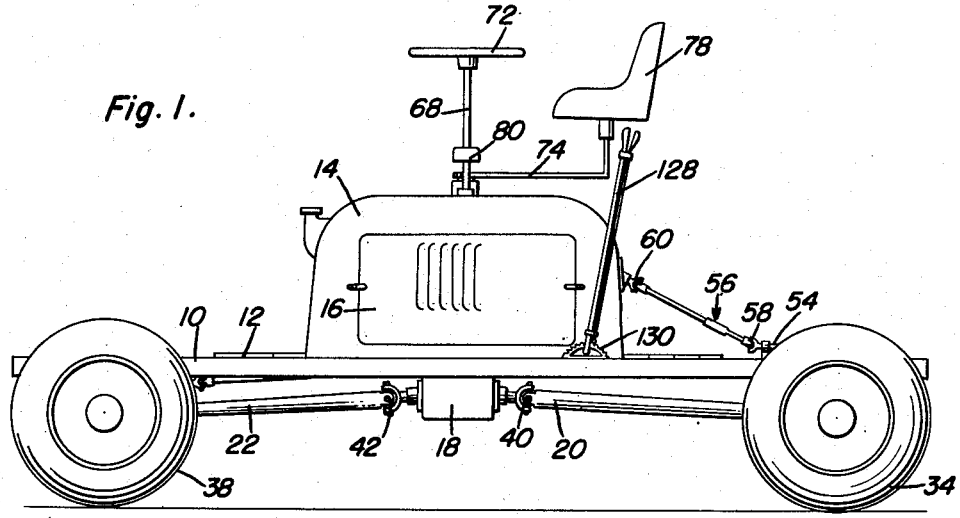
Figure 1 is an elevational view of the device.
Figure 2:
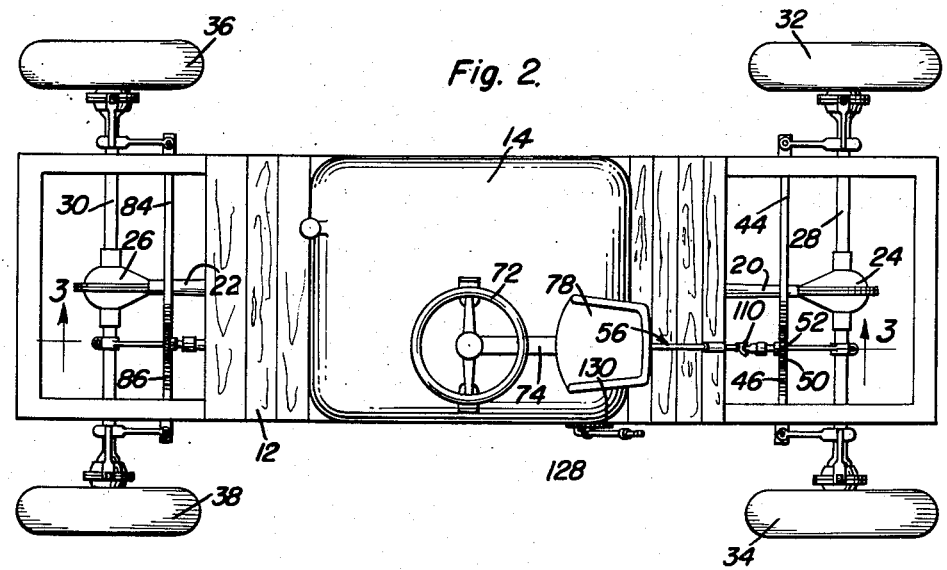
Figure 2 is a plan view of the device of Figure 1.
Figure 3:
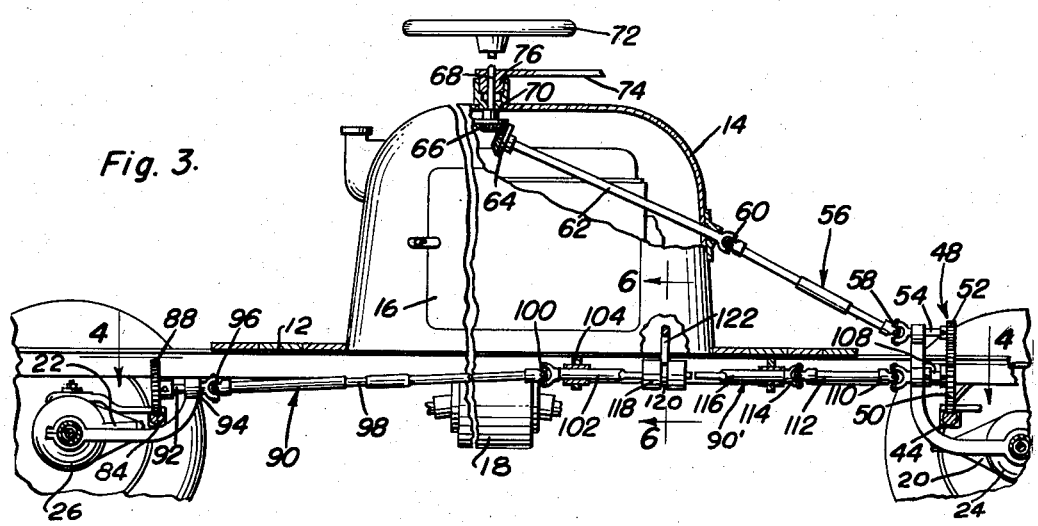
Figure 3 is a sectional view taken substantially along the line 3—3 of Figure 2 and in the direction of the arrows.
Figure 4:
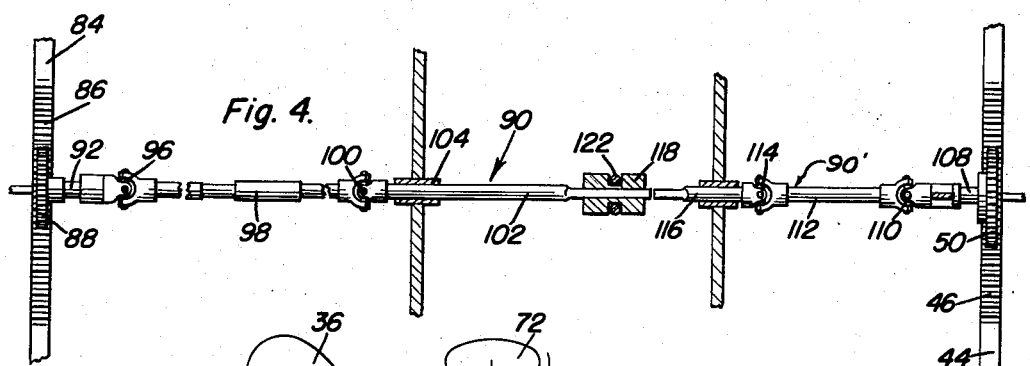
Figure 4 is a sectional view of a part of the steering mechanism, and taken substantially along the line 4—4 of Figure 3 and in the direction of the arrows.
Figure 5:
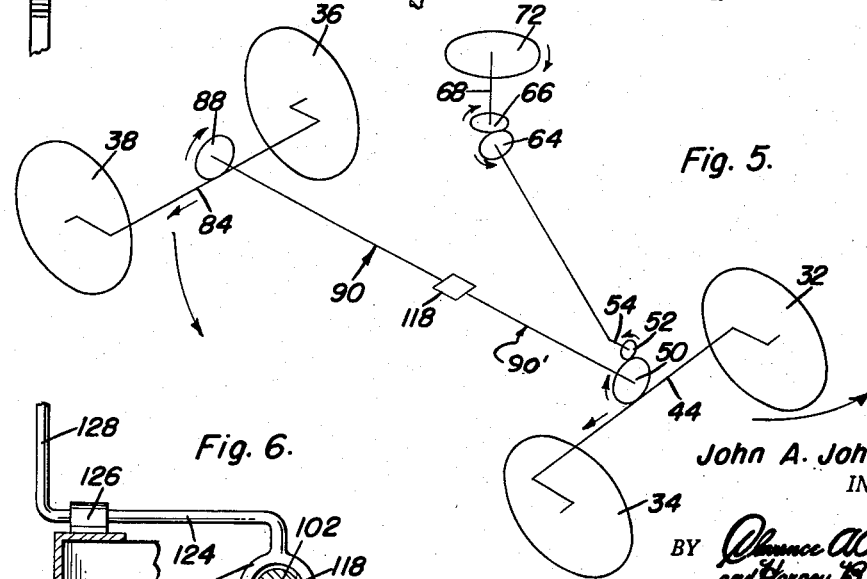
Figure 5 is a perspective schematic view showing the steering operation.
Figure 6:
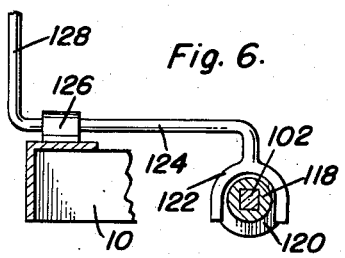
Figure 6 is an enlarged view taken substantially along the line 6—6 of Figure 3 and in the direction of the arrows.

There is a frame 10 provided with a platform 12 thereon. Drawbars may be attached to the front and rear of the frame. A motor shroud cover 14 is disposed substantially centrally of the frame and has an engine thereunder behind the access door 16. The engine is of conventional description and has the transmission 18 also of a conventional nature operatively connected therewith. Drive shafts 20 and 22 connect with the differentials 24 and 26 (Figure 2) which are interposed in the axles 28 and 30, either of which may be considered the front and the other the rear. Wheels 32 and 34 are disposed at the ends of the axle 28 and wheels 36 and 38 are disposed at the ends of the axle 30. These wheels are drivingly connected with the engine through the described structure, said described structure including various conventional expedients, as universal joints 40 and 42 in the drive shaft, wherever it is found necessary.

Each wheel is connected with the axle for steering movement by a conventional pitman steering apparatus. For the wheels 32 and 34, there is a tie rod 44 connected to the two pitman mechanisms, and this tie rod has rack gear teeth 46 thereon.

A gear train 48 is supplied in connection with this tie rod. The gear train includes a lower gear 50 which is enmeshed with said teeth 46, and a pinion 52 enmeshed with the gear 50. This pinion has a shaft 54 extending therefrom which is connected with a telescoping part 56 of a steering column through the medium of a universal joint 58. Another universal joint 60 is connected with the telescoping part 56 to the section 62. Enmeshed bevel gears 64 and 66 are provided respectively on the section 62 and the vertical steering post 68 which passes through a bearing 70 on the shroud 14. A steering wheel 72 mounted substantially centrally of the frame is fixed to the steering post 68.

A seat bracket 74 has a bearing 76 at its lower end and a seat 78 at its upper end. The bearing 76 is mounted for rotation in a part of the bearing 70 whereby the seat 78 is capable of a full 360° movement about the vertical post 68 as an axis. An upper limit collar 80 is fixed to the post 68 in order to prevent the bracket 74 from being separated from the bearing 70.

A tie rod 84 is secured at its ends to the pitman steering linkages for the wheels 36 and 38. This tie rod has teeth 86 thereon and a gear 88 is enmeshed therewith. This gear is secured to the rear section 92 of a rear sectional shaft indicated generally at 90. The section 92 is fixed directly to the gear 88 and is suspended by a bracket or hanger 94. A universal joint 96 connects the telescoping section 98 with the section 92 and a universal joint 100 connects the section 102 with the telescoping section 98. A bracket or hanger 104 is employed to hold the section 102 in place.

The gear 50 is fixed to the forward section 108 of a forward sectional shaft 90' and a universal joint 110 connects the section 112 therewith; a universal joint 114 connecting said section 112 with the section 116.

The confronting ends of the sections 102 and 116 are non-circular and are preferably square. A collar 118 having a groove 120 therearound is disposed on the end of the section 102. This collar has a bore of the same cross-sectional shape as the ends of the sections 102 and 116.

A yoke 122 is disposed in the groove 120 and the shank 124 extending from the yoke is mounted in a bearing 126 which is carried by the frame 10. Rising from the shank 124 is a control lever 128 which operates on the quadrant 130 fixed to a suitable part of the frame.

Accordingly, upon operation of the control lever 128, the collar 118 is slid forwardly or rearwardly to engage or disengage for simultaneous movement the non-circular ends of the sections 102 and 116.

In operation, the steering wheel 72 is turned. In so doing, the tie rod 44 is slid to the left or the right, thereby turning the wheels 32 and 36 in unison. Inasmuch as the gear train 48 is used to impart this movement to the tie rod 44 and one of the gears 50 is secured to the sectional shaft, the sectional shaft will rotate at the same time that the tie rod 44 is slid in one direction or the other.

However, the collar 118 may be slid forwardly or rearwardly to engage the rear part of the sectional shaft 90 or disengage it with the front part thereof. When the collar is in such position as to cause rotation of the entire sectional shaft 90, the tie rod 84 is slid in the same direction as the tie rod 44, thereby causing the other wheels 36 and 38 to be steered.

Having described the invention, what is claimed as new is:

1. In a tractor including an elongated frame having forward and rear axles and forward and rear pairs of wheels connected to the forward and rear axles for steering movement; a forward rigid tie rod terminally connected to the forward wheels; a rear rigid tie rod terminally connected to the rear wheels; forward and rear sectional shafts extending longitudinally of the frame; each of said sectional shafts being composed of three sections and universal joints connecting the sections; coaxial longitudinal bearings supported by the frame and rotatably supporting the adjacent sections of said forward and rear shafts and maintaining the adjacent sections coaxial; one section of said rear shaft being a telescoped section; forward and rear support brackets carried by said forward and rear axles and including substantially horizontal bearing portions rotatably and slidably supporting the forward section of the forward shaft and the rear section of the rear shaft, respectively; said forward tie rod having an upper face provided with rack teeth; a first gear fixed to the forward section of the forward sectional shaft and overlying and meshing with the rack teeth on said forward tie rod; said forward support bracket being provided with a second horizontal bearing portion overlying the first named bearing portion of said forward bracket; a steering column supported by the frame and having a forward horizontal shaft section journalled for rotation in said second bearing portion; a drive gear fixed on said horizontal shaft section overlying and meshing with said first gear; said first gear and said drive gear lying in the plane of the forward tie rod; said rear tie rod having an upper face provided with rack teeth; a second gear fixed to the rear end portion of the rear shaft and overlying and meshing with the rack teeth of said rear tie rod; and a clutch including a collar slidably engaged on the forward section of the rear shaft and movable selectively onto and off of the rear section of the forward shaft whereby said forward and rear shafts may be rotated as a unit, and further, whereby said forward shaft may be rotated independently of said rear shaft.

2. The combination of claim 1, and a power plant supported centrally of said frame and operatively connected to said forward and rear wheels for driving the same and having a rigid cover, a bearing carried by said cover rotatably supporting said steering column, a steering post supported by said cover and operatively connected to said steering column, and a seat including a holding bracket horizontally swingably supported on said post, whereby a driver on the seat may face forwardly or rearwardly and have access to said post.

JOHN A. JOHNSON.

References Cited in the file of this patent

UNITED STATES PATENTS

| Number | Name | Date |
|---|---|---|
| 1,093,131 | Hays | Apr. 14, 1914 |
| 1,131,729 | Neudorff | Mar. 16, 1915 |
| 1,189,378 | Mohr | July 4, 1916 |
| 1,289,296 | Stebbins et al. | Dec. 31, 1918 |
| 1,866,393 | Brooks | July 5, 1932 |
| 2,207,447 | Viles et al. | July 9, 1940 |
| 2,354,830 | Reid | Aug. 1, 1944 |
| 2,396,881 | Reed | Mar. 19, 1946 |

FOREIGN PATENTS

| Number | Country | Date |
|---|---|---|
| 3,461 | Great Britain | Feb. 11, 1902 |
| 254,705 | Italy | Aug. 25, 1927 |
| 451,813 | Great Britain | Aug. 12, 1936 |
| 489,445 | Great Britain | July 27, 1938 |